United States Patent
Crouse

(10) Patent No.: US 6,671,162 B1
(45) Date of Patent: Dec. 30, 2003

(54) HOSE WITH CONDUCTIVE FIBER

(75) Inventor: Michael L. Crouse, Murray, KY (US)

(73) Assignee: Dana Corporation, Toledo, OH (US)

( * ) Notice: Subject to any disclaimer, the term of this patent is extended or adjusted under 35 U.S.C. 154(b) by 227 days.

(21) Appl. No.: 09/893,216

(22) Filed: Jun. 26, 2001

(51) Int. Cl.⁷ ............................. H05F 3/00; F16L 11/04
(52) U.S. Cl. ..................... 361/215; 138/125; 138/103
(58) Field of Search ........................... 361/58, 56, 111, 361/119, 215; 138/125, 108, 109, 121, 133, 103, 149, 110; 156/149

(56) References Cited

U.S. PATENT DOCUMENTS

| | | |
|---|---|---|
| 4,255,487 A | 3/1981 | Sanders |
| 4,303,457 A * | 12/1981 | Johansen et al. ............ 156/149 |
| 4,675,780 A | 6/1987 | Barnes et al. |
| 4,870,535 A * | 9/1989 | Matsumoto ................. 361/215 |
| 5,037,691 A * | 8/1991 | Medney et al. ............. 428/137 |
| 5,476,121 A | 12/1995 | Yoshikawa et al. |

\* cited by examiner

*Primary Examiner*—Rajnikant B. Patel
(74) *Attorney, Agent, or Firm*—Rader, Fishman & Grauer PLLC

(57) ABSTRACT

A composite hose includes a conductive fiber media extending contiguously from one end of the hose to the other. The conductive fiber media is covered by silver plating, and in one described embodiment comprises a silver-plated nylon fiber. The nylon fiber provides a flexible medium not readily prone to breakage, while the silver plating provides relatively low electrical resistance, due to its relatively high electrical conductivity, for avoiding potentially lethal effects of static electricity. In one described embodiment, the hose includes an inner layer of an insulation material, such as rubber. An electrically conductive fiber strand is applied over the inner layer in a spiral pattern, and an outer cover material is an extruded over the inner layer of the hose and the fiber strand. In another embodiment, the hose includes a textile braided yam layer positioned directly above the strand over the inner layer, immediately beneath the outer cover.

7 Claims, 1 Drawing Sheet

HOSE WITH CONDUCTIVE FIBER

BACKGROUND OF THE INVENTION

1. Field of Invention

The present invention relates to antistatic hoses for conveyance of gases, liquids, or powders capable of producing and accumulating static electricity, and more particularly to mechanisms contained within such hoses for dissipating such static electricity accumulations.

2. Description of the Prior Art

Those skilled in the art will appreciate typical issues related to avoidance of accumulations of static electricity in hoses used to convey volatile fluids, including gases, liquids, and powders. Numerous efforts have been made, as are represented in the prior art, with respect to designs of composite hose and fiber structures capable of successfully minimizing the accumulations of static electricity over the useful life of a given hose.

Significant efforts have been directed to dissipation of such accumulations, and particularly with respect to grounding means for handling an otherwise uncontrollable buildup of static electricity generated along the structure of a hose or tube. Many efforts have been directed to the manufacture of plastic and rubber hoses that are made semi-conductive via inclusion of particles of carbon embedded in the structure of elastomers, for example. In some cases, metallic wires have been installed over the elastomer hose via braided, spiral, or helically wound structures applied about at least a portion of the hose or tube. In each of such instances, it has always been necessary to achieve electrical grounding of such wires or braids, thus generally requiring some type of multiple pronged plate or circular ring installed in the end of the hose or tube to provide satisfactory electrical grounding.

One particularly difficult issue with respect to the use of metallic members for imparting conductivity has been the high flexural moduli of metallic wires, resulting in their tendencies to break upon repeated flexing, with resultant loss of electrical conductivity.

SUMMARY OF THE INVENTION

The present invention provides an improved apparatus for a hose, the apparatus adapted to impart electrical conductivity to a rubber or elastomer layered hose member. The present invention assures conductivity for dissipating static electrical charges, while being resistant to fatigue and breakage under conditions of repeated bending and flexing of the hose member.

In a first described embodiment, the hose is a composite structure that includes a conductive fiber strand extending contiguously from one end of the hose to the other. The conductive fiber strand is covered with silver plating, and is a silver-plated nylon material in the described embodiment. The nylon provides a flexible medium not readily prone to breakage, while the silver plating provides a relatively low electrical resistance due to its relatively high electrical conductivity, for avoiding the potentially lethal effects of static electricity buildup.

Also in the described embodiment, the hose includes an inner (innermost) layer of an insulation material, such as rubber. An electrically conductive fiber strand is applied over the inner layer in a spiral pattern, and an outer cover material is extruded over the hose inner layer and the fiber strand. In an alternate embodiment, the hose includes a textile braided yarn layer positioned directly above the strand over the inner layer, immediately beneath the outer cover.

BRIEF DESCRIPTION OF THE DRAWING

The drawing FIGURE is a perspective view of a composite hose structure, with one end shown having portions thereof selectively stripped to reveal various layered components of the hose.

DETAILED DESCRIPTION OF THE EMBODIMENTS

Figure 1:
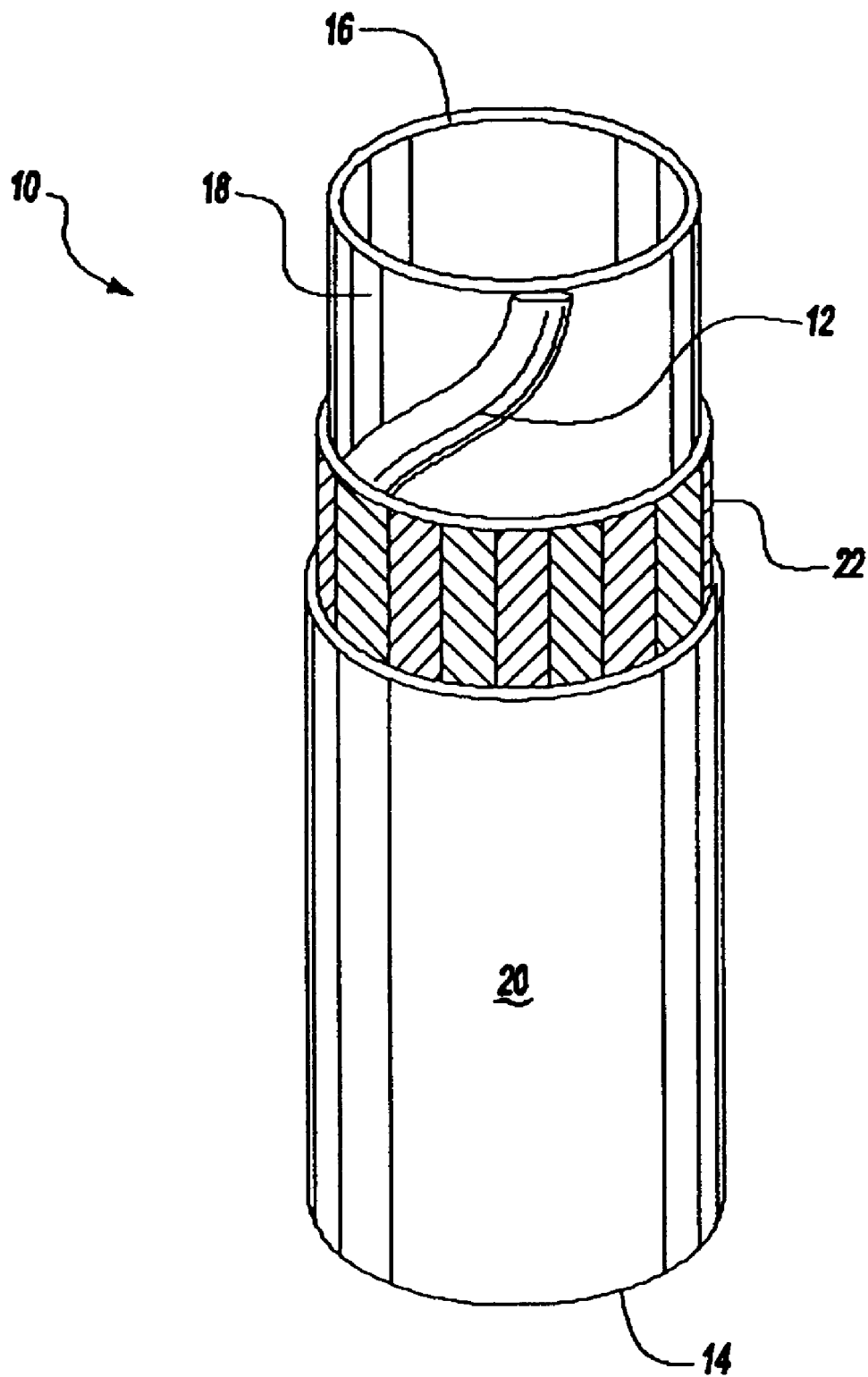

Referring initially to the drawing figure, a first embodiment of a composite hose 10 includes an electrically conductive fiber strand 12 extending contiguously from a first end 16 of the hose to a second end 14 thereof. The conductive fiber strand 12 is covered by a silver plating material, and in the embodiment disclosed comprises a silver-plated nylon material. The nylon provides a flexible medium not readily prone to breakage, while the silver plating provides relatively low electrical resistance based upon its relatively considerably enhanced electrical conductivity compared to other metals, for avoiding the potentially lethal effects of static electricity.

In the described embodiment, the hose 10 includes an inner tube or layer 18 formed of an insulation material, such as rubber or other elastomeric material composition. The electrically conductive fiber strand 12 is applied over the inner layer 18 in a spiral pattern in the embodiment shown, although other patterns may be suitable for various duty conditions. An outer cover 20, formed of a thermoplastic material is extruded over the inner layer 18 of the hose and the fiber strand 12. The choice of thermoplastic material for the outer cover 20 is motivated by the need for a material that is impervious to liquids conveyed through the composite structure of the hose 10.

In the described embodiment shown, the hose 10 includes a textile braided yarn layer 22 positioned directly above the strand 12, over the inner layer 18, and immediately beneath the outer cover 20. The braided layer imparts additional burst resistance to the hose, and as a metallic structure may actually contribute to the antistatic properties of the hose 10.

One physical embodiment of an electrically conductive fiber suitable for use in hose 10 of the present invention is manufactured by Flextex Corporation, having a corporate address at 162 Keystone Drive, Montgomeryville, Pa. The latter electrically conductive fiber is described in available Flextex literature as a silver coated, non-woven nylon fabric or yarn, and is sold under the trade name Shieldex®.

The Shieldex® conductive fiber is a strand of a yarn gauge, thus having an approximately 0.011 inch diameter. Within the context of the present invention, one contemplated use of a fiber strand of said dimension is in a hose 10 having a ⅝ inch internal diameter and having a 0.06 inch wall thickness.

Another physical embodiment of an electrically conductive fiber suitable for use in hose 10 of the present invention is manufactured by Noble Fiber Technologies, having a corporate address at 421 South State Street, Clarks Summit, Pa. The latter is described as a silver fiber, and is sold under the trade name X-Static®. Such a silver-plated nylon fiber is manufactured with a silver plating of 200 Angstrom units thick, the fiber having an overall weight/length measurement of 20 to 300 denier (each denier equals one gram per each 9,000 meters length of fiber).

It is to be understood that the above description is intended to be illustrative and not limiting. Many embodiments will be apparent to those skilled in the art upon reading the above description. The scope of the invention should be determined, however, not with reference to the above description, but with reference to the appended claims with full scope of equivalents to which such claims are entitled.

What is claimed is:

1. A flexible composite layered hose adapted to convey fluids and powders capable of generating accumulations of static electricity, said hose comprising a conductive fiber media extending contiguously from one end of the hose to the other, wherein said media is covered by a silver plating, and wherein said media comprises a silver-plated nylon material.

2. The flexible composite layered hose claim 1 wherein said hose is comprised of an inner tube and a cover, and wherein said conductive fiber is positioned intermediate and said inner tube and said cover.

3. The flexible composite layered hose of claim 2 wherein said conductive fiber media is spirally wrapped about the inner tube of said hose, and wherein said outer cover is extruded over said spirally wrapped inner tube.

4. The flexible composite layered hose of claim 3 wherein said inner tube comprises an elastomeric material, and wherein said outer cover comprises a thermoplastic material.

5. The flexible composite layered hose of claim 4 wherein said hose further comprises a textile braided yarn layer positioned over said inner tube and said conductive fiber media, and wherein said cover is applied over said braided layer.

6. The flexible composite layered hose of claim 5 wherein said cover is extruded over said braided layer.

7. The flexible composite layered hose of claim 5 wherein said fiber media comprises a unitary strand of said fiber.

\* \* \* \* \*